June 9, 1942.  R. W. YOUNG ET AL  2,286,030
STROBOSCOPE
Filed May 28, 1938  7 Sheets-Sheet 1

INVENTORS.
ROBERT W. YOUNG &
ALLEN LOOMIS
BY McConkey, Dawson & Booth
ATTORNEYS.

June 9, 1942.  R. W. YOUNG ET AL  2,286,030
STROBOSCOPE
Filed May 28, 1938  7 Sheets-Sheet 3
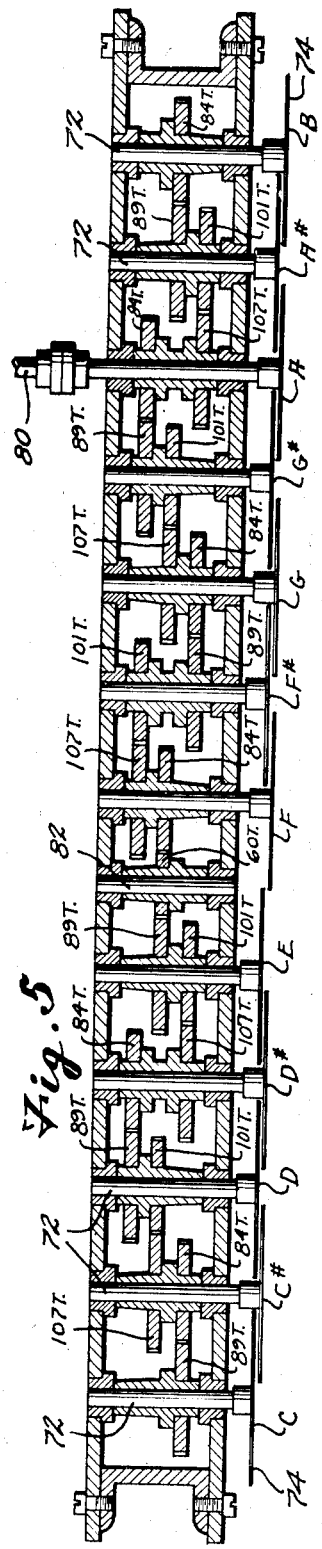
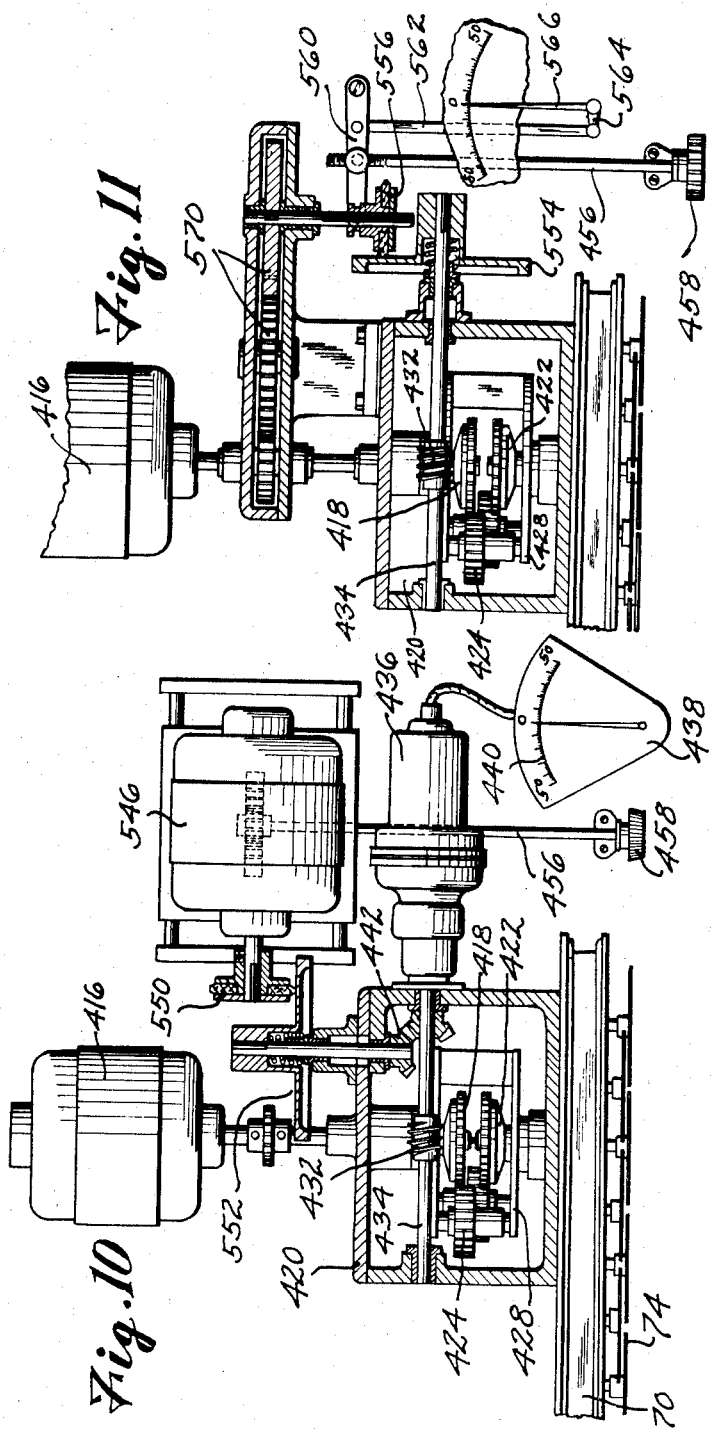
INVENTORS.
ROBERT W. YOUNG &
BY ALLEN LOOMIS
McConkey, Dawson & Booth
ATTORNEYS

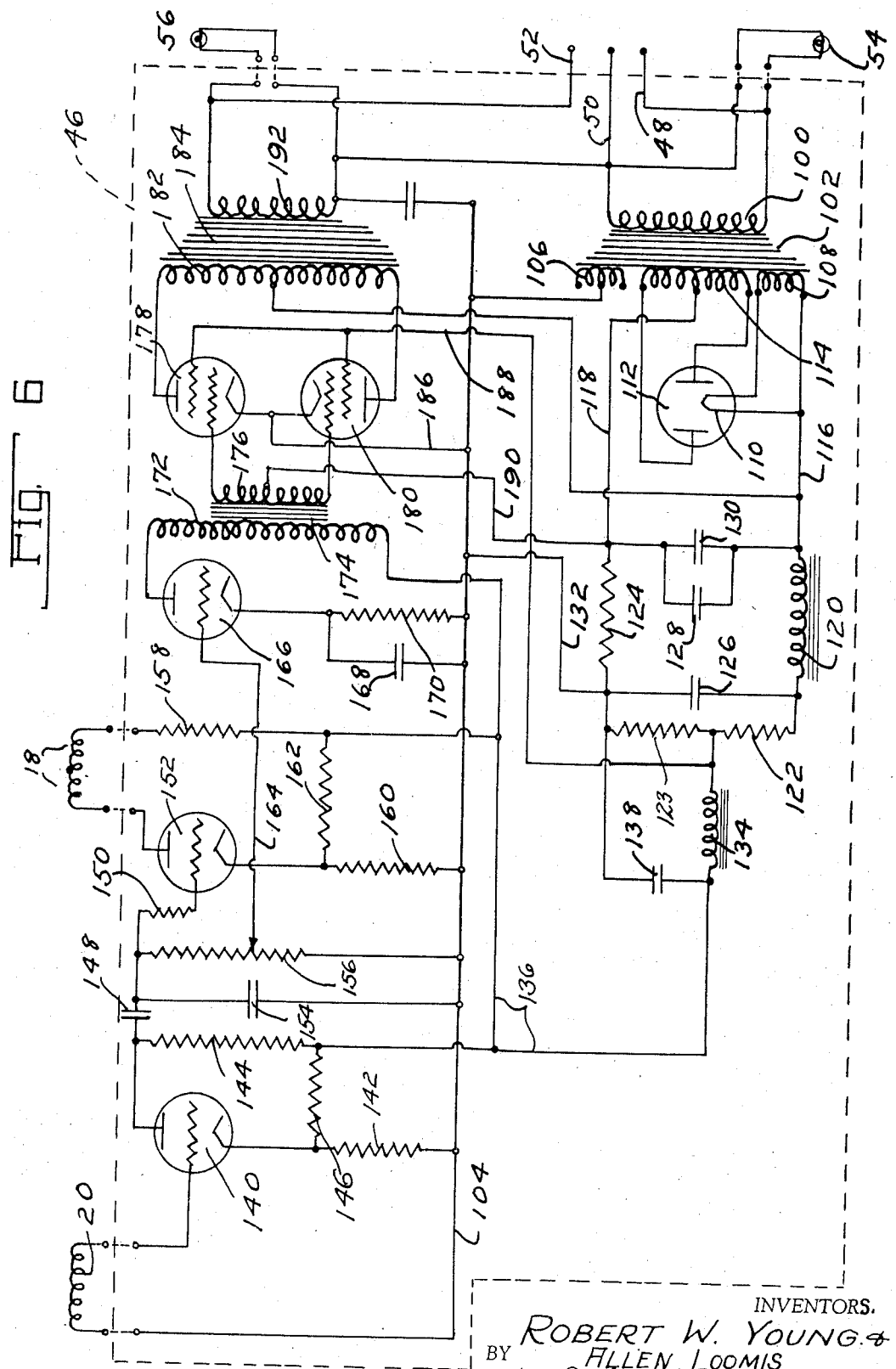

June 9, 1942.  R. W. YOUNG ET AL  2,286,030
STROBOSCOPE
Filed May 28, 1938  7 Sheets-Sheet 5

INVENTORS.
ROBERT W YOUNG &
ALLEN LOOMIS
BY McConkey Dawson & Booth
ATTORNEYS.

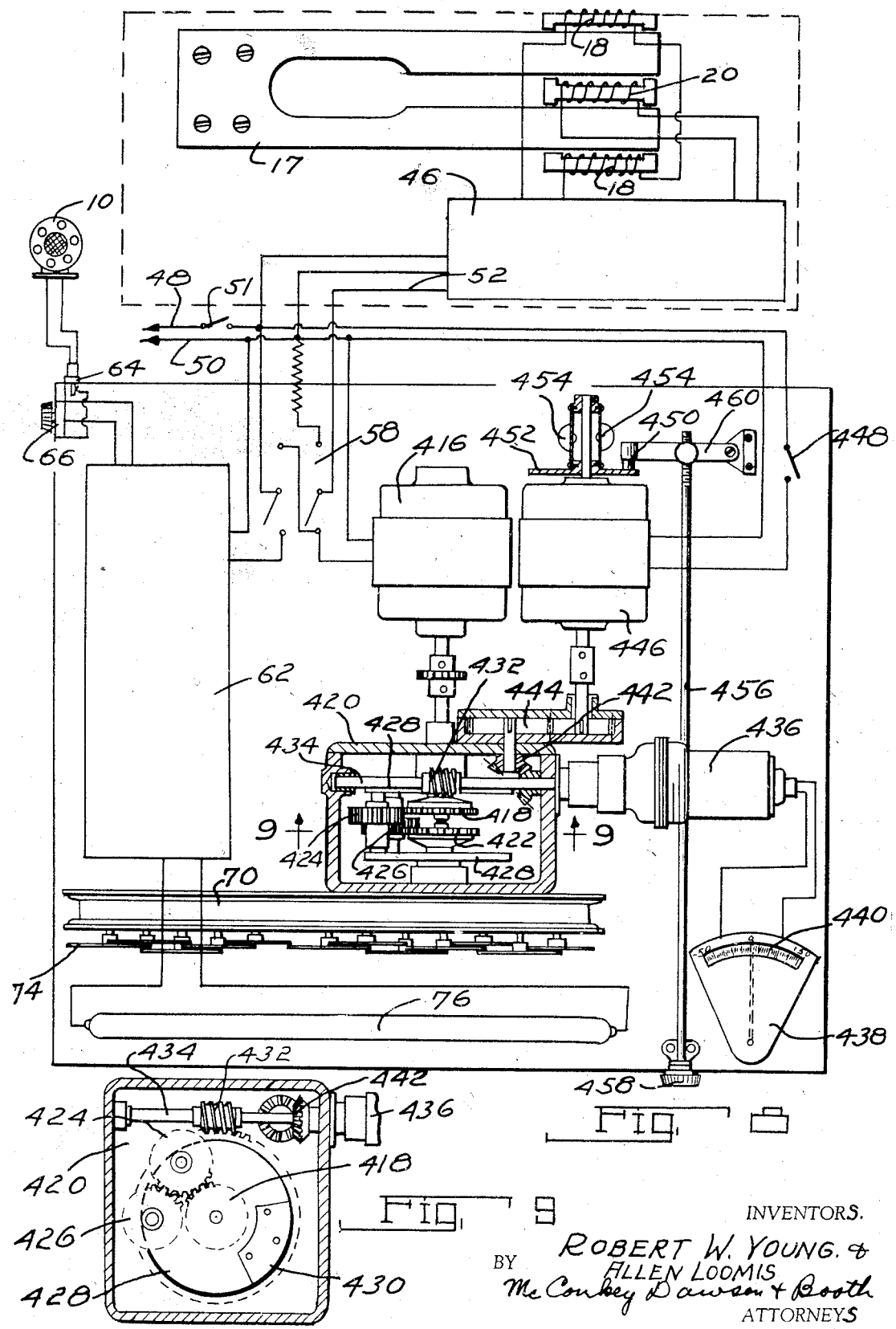

June 9, 1942.  R. W. YOUNG ET AL  2,286,030
STROBOSCOPE
Filed May 28, 1938  7 Sheets-Sheet 7

INVENTORS
ROBERT W. YOUNG &
BY ALLEN LOOMIS
McConkey, Dawson & Booth
ATTORNEYS.

Patented June 9, 1942

2,286,030

UNITED STATES PATENT OFFICE 2,286,030

STROBOSCOPE

Robert W. Young and Allen Loomis, Elkhart, Ind., assignors to C. G. Conn, Ltd., Elkhart, Ind., a corporation of Indiana Application May 28, 1938, Serial No. 210,636

35 Claims. (Cl. 88—14)

This invention relates to the determination of ratios, particularly those ratios used in describing the pitch of sounds, as for example in tuning musical instruments, and is illustrated as embodied in apparatus for visually showing quickly the approximate pitch of a sound and whether it is flat or sharp with respect to a standard pitch, and provided with means for quickly and accurately determining how much it is flat or sharp.

An object of the invention is to provide indicating means, as for example a series of patterned stroboscope disks, corresponding to a series of notes of a musical scale, so that a note anywhere in the scale can immediately be compared with its standard without having to set or adjust the apparatus. Preferably the disks or their equivalent correspond to the notes of the chromatic scale, and each disk bears a series of patterns which correspond to notes separated by a basic interval such as an octave or a fifth or a twelfth. Where the octave is selected as the interval between successive patterns on the disk, we prefer to provide a disk for each note of one octave of the chromatic scale, arranged in the same manner as the notes of one octave of a piano keyboard, so that they can be very quickly recognized.

Another object of the invention is to provide simple means for accurately driving a series of such disks, or their equivalents, at speeds having ratios substantially the same as the ratios between the numbers of vibrations in the successive chromatic notes. When tuning to perfect octaves this ratio is $$\sqrt[12]{2}$$

In the arrangement illustrated, the disks are driven by intermeshing sets of gears.

Since exactly this ratio cannot be secured with gears, we secure accuracy within a very small limit of error (much less than can be detected in sounds by the human ear) by having the gears of these sets in ratios which are alternately slightly less and slightly greater than the true mathematical ratio desired. In tuning to perfect octaves, the ratios may be alternately 89/84 and 107/101, the first being greater than and the second slightly less than $$\sqrt[12]{2}$$

A further and very important object of the invention is to provide an adjustment acting simultaneously on the speeds of all of a series of stroboscopic disks or the like, and which varies all of the speeds in the same ratio. Thus the same adjustment to slow up the disks for any note which is flat, or to speed it up for any note which is sharp, will correspond to the same fraction of a semitone no matter where the note may be on the scale. This permits us to provide an indicator for the adjusting means which is calibrated to read directly in fractions of a semitone flat or sharp.

Various features of the invention relate to the provision of means insuring an accurate driving speed, to arrangements facilitating compact mounting of the parts so they can (for example) be housed in portable cabinets, and to other novel arrangements and desirable combinations which will be apparent from the following description of the illustrative embodiments shown in the accompanying drawings, in which:

Figure 5 is a section through the transmission gearing, generally on the line 5—5 of Figure 3, but showing the gears all on the same level (i. e. it is a developed section through the axes of the gears);

Figure 6 is a wiring diagram of the fork amplifier, which is indicated only in outline in Figure 4;

Figure 8 is a schematic illustration, similar to Figure 4, but showing a different embodiment of the invention;

Figure 9 is a partial section on the line 9—9 of Figure 8;

Figures 10 and 11 are sectional views of two different drive mechanisms, either of which may be substituted for the drive mechanism of Figure 8;

Figure 14:
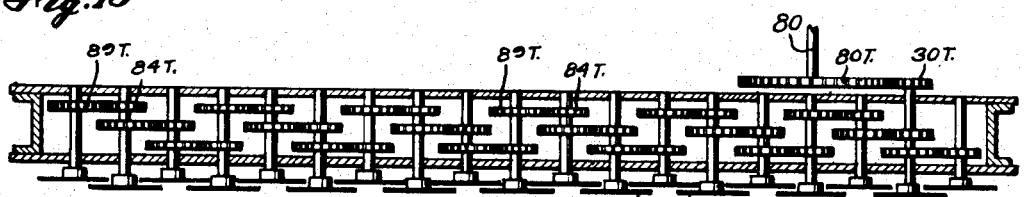
Figure 15:
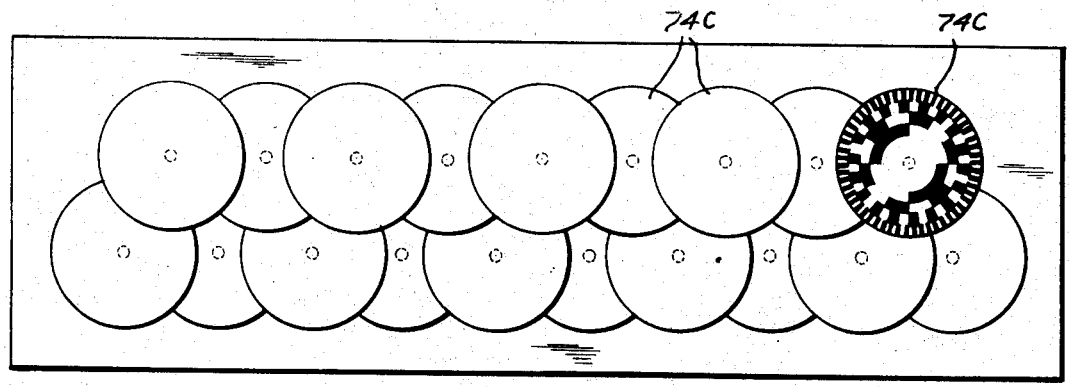
Figure 16:
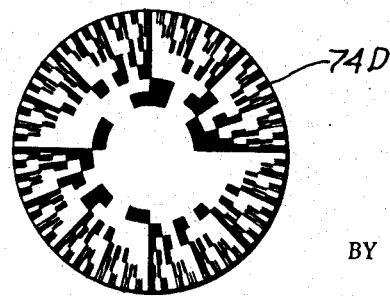

Figure 14 is a developed section of the gearing; and Figure 15 is an elevation of the stroboscopic disks, of an apparatus which tunes by perfect twelfths; and Figure 16 is an elevation of a stroboscopic disk designed to show not only the accuracy of the tuning of the fundamental tone, but also and at the same time, to show the presence or absence of a harmonic of the fundamental tone, the disk illustrated being designed to show the fifth.

Figure 4:
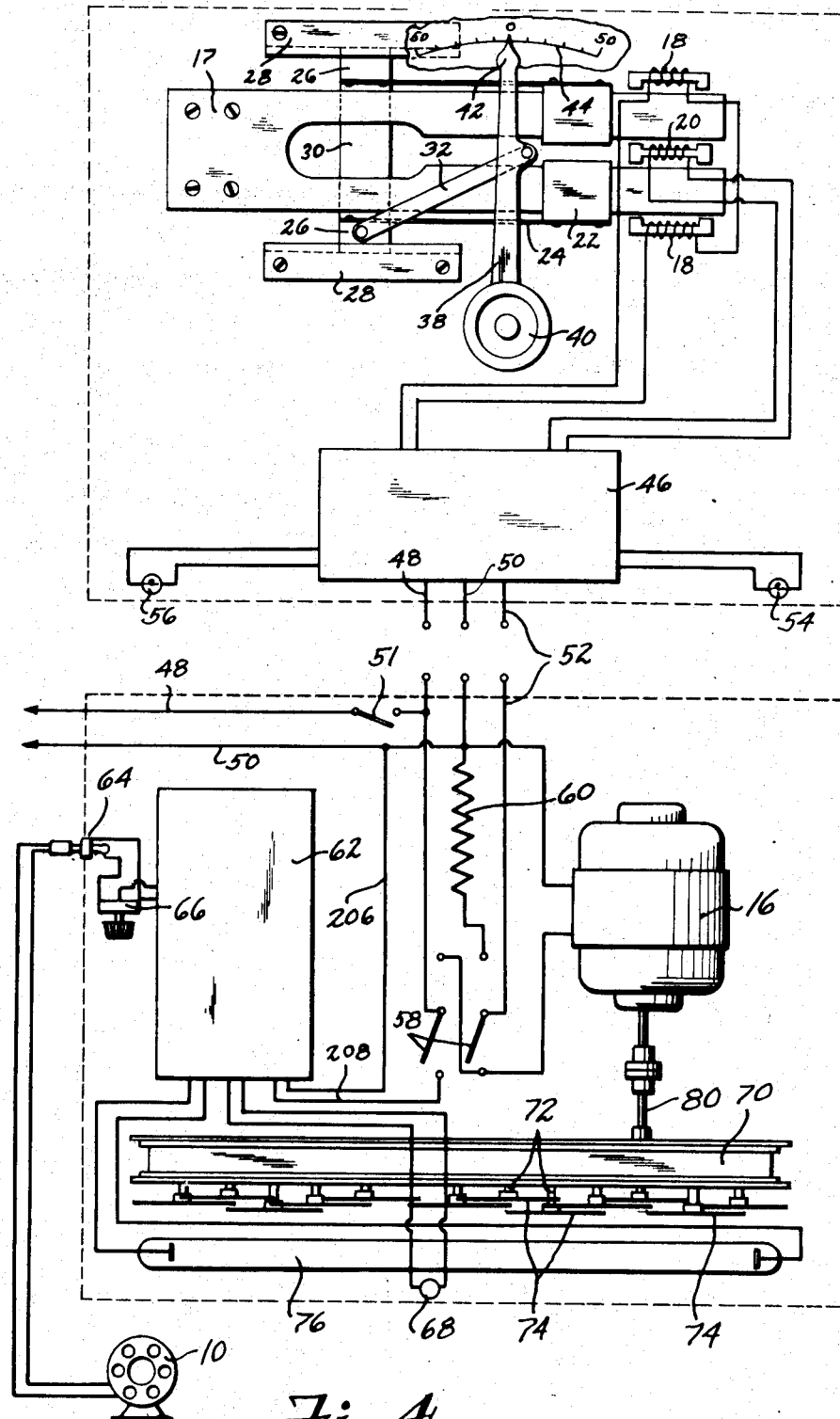
Figure 4 is a schematic illustration including a wiring diagram of the entire apparatus.

For convenience in handling the apparatus, we prefer to arrange it in three main parts: (1) a microphone 10, a stroboscopic mechanism housed in a cabinet 12 (indicated in Figure 4 by a dotted line surrounding the parts inclosed in the cabinet), and a tuning fork control mechanism housed in a cabinet 14 (also indicated in Figure 4 by a dotted line).

The mechanism in the cabinet 14 serves to supply alternating current at a very accurately determined and maintained frequency to a synchronous motor 16 in the cabinet 12. The frequency of the current, and therefore the speed of the motor 16, is controlled by a tuning fork 17 mounted in the cabinet 14 and caused to vibrate by the energization of driver coils 18 wound about suitable magnetized iron cores, thereby causing alternating voltage to be generated in a pickup coil 20 wound on a magnetized iron core and arranged between the arms of the tuning fork 17.

The frequency of vibration of the tuning fork 17 can be varied by shifting weights 22 slidably mounted on its arms and connected by leaf springs 24 to guide blocks 26 slidably mounted in grooves in fixed members 28. The guide blocks 26 are connected by a bar 30 connected by a link 32 to an arm 38 shifted by manipulating a knob 40. The arm 38 is formed with an indicator 42 which, as explained below, moves over a scale 44 graduated to read directly in hundredths of a semitone (cents) flat or sharp.

The alternating current from the pickup 20 controls an amplifier 46, hereinafter more fully described and a wiring diagram of which is shown in Figure 6. Current is supplied to this amplifier from power lines 48 and 50, in one of which is a starting switch 51 (shown mounted on the cabinet 12), and after being converted in the amplifier 46 under the control of tuning fork 17 to current alternating at a very accurately determined frequency is fed through lines 50 and 52 to the mechanism in the cabinet 12. There are also shown on the cabinet 14 two pilot lights 54 and 56, the first of which lights up as soon as the apparatus is turned on and the other of which lights up as soon as the amplifier 46 warms up.

The apparatus in the cabinet 12 includes the synchronous motor 16, which when the apparatus is first started is connected between line 50 and line 48 in parallel with the amplifier 46, by turning upwardly a double-pole double-throw switch 58. The same upper or starting position of the switch 58 closes a circuit between lines 50 and 52 through a resistance 60 which provides a warming up load for the amplifier 46.

As soon as the pilot light 56 comes on, the switch 58 is closed downwardly, opening the circuit through the resistance 60 and the direct circuit through the motor 16 between lines 48 and 50 and closing a circuit through the motor 16 between lines 50 and 52, after which the speed of the motor is controlled by the tuning fork 17. At the same time a circuit is closed directly between lines 48 and 50 through a flash amplifier 62 described below, and to which the microphone 10 is connected by being plugged into a jack 64 connecting it to the amplifier through a volume control such as a variable resistance 66. The flash amplifier 62 also has a pilot light 68 to show when it is on.

The motor 16 drives a set of gears in a casing 70 to drive a series of parallel shafts 72 carrying stroboscopic disks 74 at speeds proportioned to the number of vibrations per second in the notes of one octave of a chromatic scale. The amplifier 62, which is controlled by the microphone 10, in turn controls the flashing of a neon or other lamp 76.

It will be seen that if the flashing of the lamp 76 is synchronized with the rotation of a suitable pattern on one of the disks 74, the pattern will seem to stand still. If the note is flat or sharp, the pattern will appear to turn slowly in one direction or the other. By adjusting the knob 40 until the pattern appears stationary, the amount the note is flat or sharp may be indicated on the scale 44.

Figure 3:
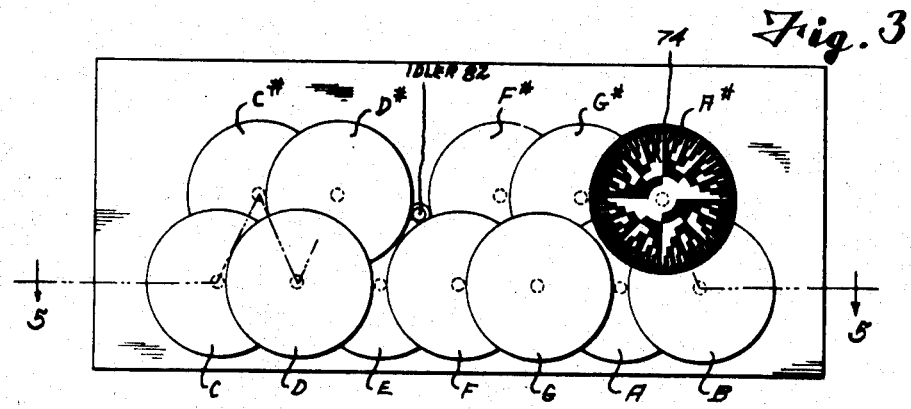
Figure 3 is a front elevation of the stroboscopic disks, in a plane just inside the panel shown in Figure 2.

Each disk 74 has formed thereon seven concentric zones divided into equal alternate light and dark spaces, with twice as many such spaces in each zone as in the next inner zone, or half as many as in the next outer zone. Thus one such disk, for example, driven at a suitable speed, will serve to check the tuning of all of the "A's" in seven octaves. As a matter of convenience for the use of musicians, all of whom are familiar with the piano keyboard, we prefer to provide twelve of these disks arranged as shown in Figure 3 in the same manner as the notes of an octave of the chromatic scale, and driven at speeds synchronized with the vibration frequencies of those notes.

Figure 1:
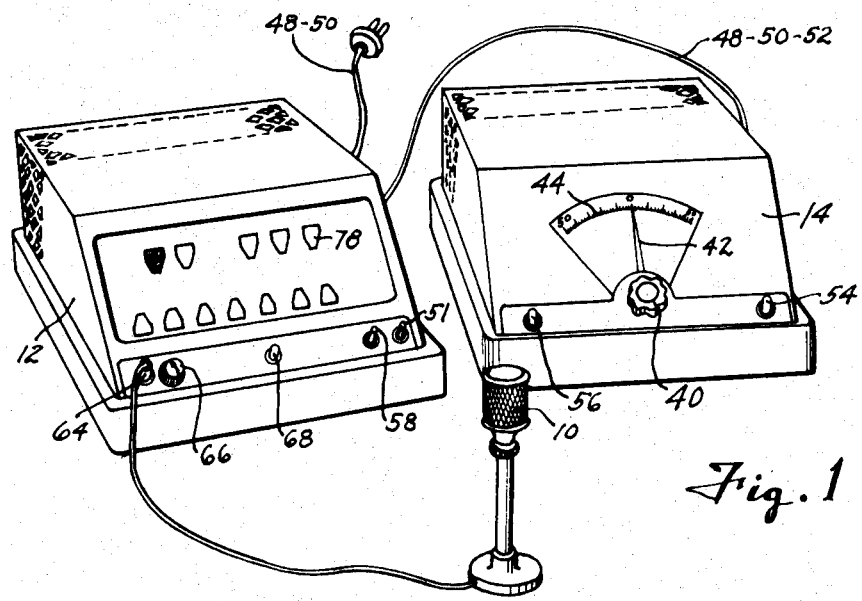
Figure 1 is a perspective view of an apparatus including a microphone, a cabinet containing the stroboscopic mechanism, and another cabinet containing a tuning fork control for the speed of the stroboscopic mechanism.
Figure 2:
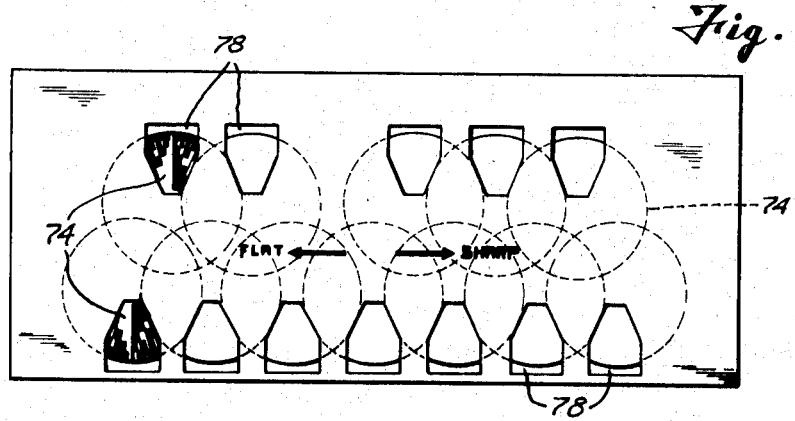
Figure 2 is a view on a larger scale of the indicating panel of the first cabinet.

In order to make the apparatus as compact as possible, the disks 74 overlap each other, and the front panel or mask of the cabinet 12 has a series of small windows 78 through which the bottom sectors of the lower disks, and the upper sectors of the upper disks, may be viewed. As the gearing described below drives the upper disks in the opposite direction from the lower disks, this means that all the patterns seem to move to the left when the notes are flat, and to the right when the notes are sharp, and the panel as shown in Figure 2 may be marked accordingly.

Figure 5 shows the gearing necessary to drive the disks 74 at the proper relative speeds. The drive shaft 80 is normally driven by the motor 16 at a standard speed of 1650 R. P. M. (27.5 R. P. S.), and is directly connected to the shaft 72 carrying the disk 74 for the seven notes "A." The motor 16 may be a four-pole 55 cycle motor. As the illustrated disks are provided with 2, 4, 8, 16, 32, 64, and 128 dark subdivisions alternating with the same number of light segments in the seven concentric zones, the central zone of this disk corresponds to the "A" of 440 vibrations per second to which note the orchestra is usually tuned, inasmuch as $27.5 \times 16 = 440$. The various notes to which the other disks correspond are shown in Figures 5 and 3.

It is not possible to provide gearing which will give the shafts 72 exactly the mathematically exact speeds they should have, if they are all geared together, as the ratio between speeds to give a perfect octave is $$\sqrt[12]{2}$$

and it is not possible to secure exactly this ratio with gearing. According to one feature of our invention, a substantially exact octave is secured and no note is off far enough to be detected by ear, by providing sets of gears between the shafts which are alternately slightly above and slightly below the exact ratio desired.

We prefer to use the gearing shown in Figure 5, where alternate shafts 72 (including the one directly driven by shaft 80) are provided with gears having 84 teeth which mesh with 89-tooth gears on the shafts at their left, and with 107-tooth gears meshing with 101-tooth gears on the shafts at their right.

In addition to the shafts 72, in order to preserve the arrangement simulating a piano keyboard, the eighth shaft from the right in Figure 5 is an idler shaft 82 which does not carry any disk, and which merely reverses the rotation between the "F" shaft and the "E" shaft. It is shown with a 60-tooth gear driven by the 84-tooth gear on the "F" shaft and driving the 89-tooth gear on the "E" shaft 72.

Aside from the details of the amplifiers 46 and 62, further explained below, it is believed that the operation of the apparatus will now be apparent. The apparatus in the cabinet 14 has for its final function driving the motor 16 at a very accurately determined speed, which can be very accurately varied in a narrow range (corresponding to one-half a semitone) above and below its standard speed by shifting the weights 22. This variation is read directly in "cents" flat or sharp on the scale 44.

The disks 74 are all driven at speeds correspondingly synchronized with the vibration frequencies of the notes of the chromatic scale, and due to the printing of the seven patterns on each disk the notes of seven octaves of the chromatic scale can be checked on the illustrated apparatus.

The light 76 is flashed on and off at a frequency synchronized with the vibration frequency of the note picked up by the microphone 10. Consequently, if that note is within the seven-octave range, the corresponding one of the patterns on the disks will appear stationary, or will appear to turn in one direction or the other if flat or sharp. Knob 40 may be turned until the pattern finally does appear stationary, if it is desired to know how much the note is flat or sharp.

It is important to note that, since the gear ratios are fixed, and the adjustment is ahead of a member which drives all the gears, the adjustment affects all the disks by the same ratio of change and not arithmetically by some fixed number of revolutions per minute, which would not have the same effect on all the notes. And since the semitone is also a ratio, and not a fixed number of vibrations per second, the adjustment can be read directly as a fraction of a semitone, whether the note is high or low on the scale. This is a very important feature of the invention.

Figure 6 shows the fork amplifier system 46 which we prefer to use. The input wires 48 and 50 are connected, in parallel, with the pilot light 54 and with the primary winding 100 of a transformer 102. The ground of the various circuits, is indicated by a horizontal line 104. The circuits below that line comprise a power pack, supplying direct current derived from the input alternating current. The circuits above that line comprise the amplifying and control circuits. There are three secondaries in the transformer 102. The upper secondary 106 is used to supply current to heat the cathodes of the various tubes in the amplifying circuits. As the connections to these tubes are well understood, in order to simplify the diagram they have been omitted. The lowermost secondary 108 is connected to heat the cathode filament 110 of a tube 112 forming part of a full-wave rectifier, the plates or anodes of the tubes being connected in the usual way to the opposite ends of the intermediate secondary 114. This supplies pulsating direct current to a circuit including on one side a line 116 connected to the filament 110 and on the other side a line 118 connected to the center of the intermediate secondary 114.

This pulsating current is smoothed out in the filter at the left of the rectifier. The line 116 is connected through an iron core inductance 120 to one end of a resistance 122, and the line 118 is connected to the end of a resistance 123, in series with the resistance 122, through a resistance 124. The opposite ends of the resistance 124 are connected to the opposite ends of the inductance 120, on the left through a condenser 126 and on the right through condensers 128 and 130 arranged in parallel. The left end of the resistance 124 is grounded by a line 132. The upper end of the resistance 122 is connected through an inductance 134 to a line 136 which is connected to various parts of the amplifier circuits, and the left end of the inductance 134 is connected through a condenser 138 to the junction between the resistances 124 and 123.

The above-described circuits form a power pack supplying direct current in the usual manner to the amplifier circuits described below.

The pickup coil 20 is connected at one end to the grid of a triode tube 140, the cathode of which is connected through a resistance 142 to ground. The plate or anode is connected to the line 136 through a resistance 144, and a suitable potential is maintained on the cathode by a resistance 146 connected between it and the line 136.

The anode of the tube 140 is also connected through a condenser 148 and a resistance 150 to the grid of a triode tube 152 in the next stage, a condenser 154 and a resistance 156 being connected to ground in parallel between the condenser 148 and the resistance 150. There is thus provided a resistance coupling between these two stages.

The anode of the tube 152 is connected through the drive coils 18 and a resistance 158 to the line 136; the cathode is connected to ground through a resistance 160; and a suitable potential is maintained on the cathode by a resistance 162 connected between it and the line 136. Thus the pulsations of current in the drive coils 18 follow exactly the voltage pulsations set up in the pickup coil 20.

The pickup coil circuit is also shown connected to two amplifier stages, the first of which may be regarded as in parallel with the drive coil circuit just described. This connection is from a line 164 variably connected to the resistance 156, to give an adjustably controlled voltage, and which is connected to the grid of a triode tube 166 having its cathode connected to ground in the usual manner through a condenser 168 and a resistance 170 arranged in parallel. The anode of tube 166 is connected to the line 136 through the primary 172 of a transformer 174.

The secondary 176 of the transformer 174 is connected at its ends to the control grids of two tetrode tubes 178 and 180 connected in a push-pull arrangement with their anodes connected to the ends of the primary 182 of a stepdown transformer 184. The two cathodes of tubes 178 and 180 are connected to each other and grounded by a line 186. The screen grids of the tubes are connected to each other and to the junction of resistances 122 and 123 by a line 188, to give the proper voltage on these grids. The center of the secondary 176 is connected by a line 190 to the line 118.

The secondary 192 is connected in parallel to the pilot light 56 and to the output lines 50 and 52. The net result of adding the circuit of Figure 6, or what we have previously referred to as called the fork amplifier circuit, is to take an alternating current whose frequency is not quite steady enough, change it into a direct current, and then re-convert it into an alternating current whose frequency is very accurately controlled by the natural vibration frequency of the tuning fork 17.

Figure 7:
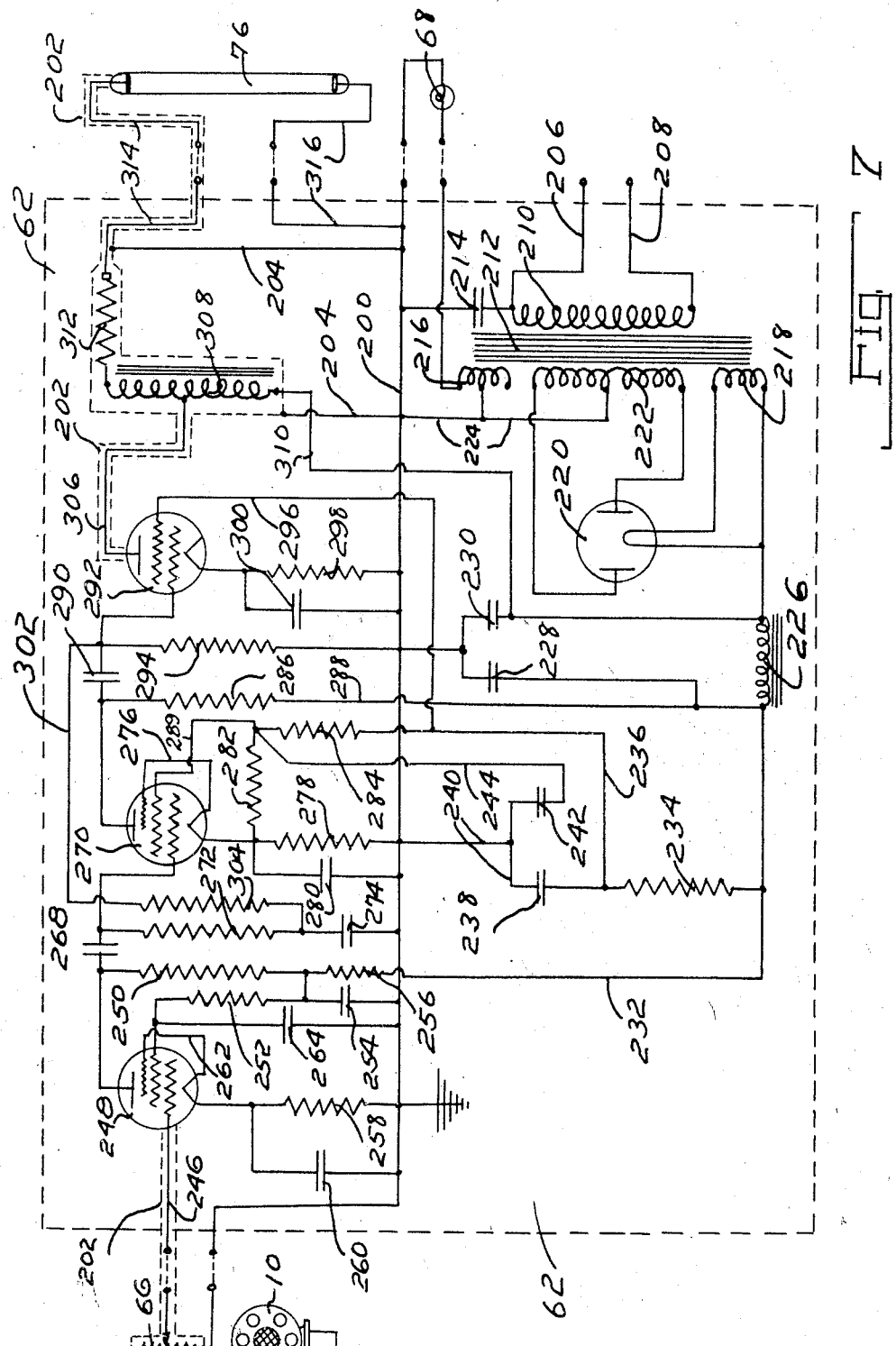
Figure 7 is a wiring diagram of the flash amplifier, also indicated only in outline in Figure 4.

The flash amplifier 62 is shown in detail in Figure 7. In this figure, for convenience the ground 200 is shown as a horizontal line, with what amounts to a power-pack and filter below that line and with the amplifier circuits above that line. Certain parts are shielded, the shielding being indicated by dotted lines 202 and grounded where necessary, as for example at 204. The input to this amplifier is a line 206 from one power input line 50, and a line 208 which (when the switch 58 is in its lower or running position) is connected to the other input power line 48.

The input lines 206 and 208 are connected to the terminals of the primary 210 of a transformer 212, the primary being grounded through a condenser 214. There are three secondaries to this transformer, the upper one 216 being grounded at its center and having one side connected to ground through the pilot light 68, and having its ends connected (by connections not shown, and in the usual manner) to supply heating current to the heaters for the cathodes of the various tubes in the amplifier circuits (i. e. above the line 200 indicating the ground).

The lowest secondary 218 is connected to heat the filament of a tube 220 in a full-wave rectifier circuit. The plates of the tube are connected to opposite ends of the intermediate secondary winding 222. The center of this secondary 222 is connected to ground by a line 224. The filament side of the rectifier is connected to an iron-core inductance 226, the opposite ends of which are grounded through condensers 228 and 230.

Beyond the inductance 226 is a line 232 leading into the first stage circuit, and arranged in parallel with a resistance 234 connected to a line 236 having connections leading into the second and third stage circuits. The upper end of resistance 234 is grounded through a condenser 238 by a line 240, and the line 240 in turn is connected through a condenser 242 to a line 244 leading into the second stage circuit. It will be noted that resistance 234 and line 236, with resistances 278 and 282 and 284 described below, form a circuit from the high voltage side to ground.

The above-described parts, it will be recognized, constitute a power-pack receiving alternating current, and delivering direct current at various voltages to parts of the amplifier circuits as described below.

The microphone 10 is connected, through the volume control 66, to the ground 200 and to a shielded line 246 connected to the control grid of a pentode tube (which may be a type 6J7 tube) 248. The plate or anode of the tube 248 is connected through a plate load or coupling resistance 250 to a junction between a resistance 252 and condenser 254 through which the screen grid of the tube is grounded, and thence through another resistance 256 to the direct current power line 232. Impedances 254 and 256 form a filter for the high voltage supply for this stage. The cathode of the tube 248 is connected to ground through a resistance 258 and a condenser 260 arranged in parallel. The suppressor grid of the tube 248 is connected in the usual manner direct to the cathode by a line 262. The screen grid, in addition to being grounded through the resistance 252 and the condenser 254, is also directly grounded through a condenser 264. Resistance 252 and condenser 264 form a filter for the D. C. voltage supply for the screen grid.

The above-described first stage is resistance-coupled to the second stage, the anode of tube 248 (above the resistance 250) being connected by a condenser 268 to the grid of a second pentode tube 270 (type 6K7), and also through a resistance 272 and condenser 274 to ground. The suppressor grid of the tube 270 is connected by a line 276 to the cathode, and the cathode is connected to ground through a resistance 278 and a condenser 280 arranged in parallel.

The cathode is also connected by a resistance 282 to the line 244 and to a resistance 284 in parallel therewith and connected to the line 236. The anode is connected by a resistance 286 and a line 288 to the end of the inductance 226, this in effect forming a connection from the inductance in parallel with the connections therefrom to the grid of tube 248. The screen grid of the tube 270 is connected by a line 289 to the junction between resistances 282 and 284.

The circuit 234—236—284—282—278 serves as a voltage divider circuit from the high D. C. voltage line 232 to ground. At the junction between resistances 234 and 284 is taken off the screen grid voltage for the third stage tube 292. At the junction between the resistances 284 and 282, line 289 takes the screen grid voltage to tube 270, by-passed by condenser 242. The cathode of tube 270 is connected at the junction of resistances 282 and 278, by-passed to ground by condenser 280.

The anode of tube 270, above the resistance 286, is connected by a condenser 290 to the grid of a tetrode tube 292 (type 6L6), and also through a resistance 294 to ground. The screen grid of tube 292 is connected by a line 296 to the line 236 between the resistances 234 and 284. The cathode is connected to ground by a resistance 298 and condenser 300 arranged in parallel. In order to secure a constant-volume output from this stage, the grid is connected back through a line 302 and a resistance 304, and through the resistance 272 previously described, to the grid of the tube 270. Tube 270 is a variable mu type of tube, whose amplification can be decreased by increasing its negative control grid bias. The negative swings of the control grid of tube 292 cause current impulses through the lamp 76 as described below while the positive swings of the control grid of tube 292 cause it to become positive with respect to the cathode and therefore to draw grid current. This grid current flows through resistance 294 and produces an average negative bias which is applied to the control grid of tube 270 through the resistance 304 and condenser 274 acting as a filter. This negative bias decreases the amplification of tube 270 as the control grid voltage swings of the tube 292 increase due to increased sound intensity.

The plate of the tube 292 is connected by a shielded line 306 to the central point of an iron core auto-transformer 308 of about 3:1 step-up ratio. The lower end of this auto-transformer is connected by a line 310 between the condenser 230 and the cathode circuit from tube 220, so that a relatively high voltage is impressed on the coil 308. The upper end of the inductance 308 is connected through a resistance 312 and a line 314 to one electrode of the gas-filled lamp 76. The other electrode of the lamp is grounded by a line 316.

Due to the constant D. C. voltage, there is a constant tendency for current to flow through the lamp 76. The lamp requires a relatively high voltage (e. g. 900 volts) to start, and upon starting the voltage drops to a much lower value (e. g. 250 volts), the remainder being lost by the current flowing through the series resistance 312. When the applied voltage falls below 250, the lamp goes out and must be started again by raising the voltage to 900.

When the control grid potential of tube 292 swings negative, the plate potential swings positive, and the upper end of the auto-transformer 308 swings three times as much positive. This voltage, added to the direct voltage already on the lamp, starts the lamp. When the control grid potential of tube 292 swings positive, the plate potential swings negative and the upper end of the transformer 308 swings even more negative and the difference instead of the sum of the voltages is applied to the lamp, which goes out as the voltage drops. The difference is not sufficient to start the lamp, which remains dark for this half cycle.

Thus there are distinctly separated relatively strong current impulses, all in the same direction, through the lamp 76, causing the lamp to flash brilliantly once only in each cycle in synchronism with the vibrations affecting the microphone 10, the intensity of the flashes being substantially constant.

The arrangement of Figure 8 differs from that described above, in that the fork 17 is not adjustable, and drives a motor 416 always at the same constant speed. The motor 416 is connected to one sun gear 418 of a differential-gear mechanism 420, having an opposite sun gear 422 drivably connected with the transmission 70.

The sun gears 418 and 422 are connected by meshing with opposite ones of a pair of intermeshing planet gears 424 and 426 carried by rotatably mounted planet carrier disks 428. A weight 430 mounted between the disks 428 counter-balances the planet gears 424 and 426.

The upper planet carrier disk 428 is peripherally provided with a worm gear driven by a worm 432 on a shaft 434 which drives a small generator 436, the output of which is connected to a meter 438 calibrated to show on a scale 440 the adjustment in "cents," as in the first embodiment. The shaft 434 is driven through bevel pinions 442 and gearing 444 by a motor 446 connected across the lines 48 and 50 (with a switch 448 if desired).

The speed of the motor 446 is controlled by a friction brake 450 bearing on a disk 452 slidably keyed on the armature shaft of the motor, and urged upwardly as the motor speed increases by centrifugal weights 454. The pressure on the brake 450 is controlled by a threaded rod 456 operated by a knob 458 at the front of the cabinet and threaded into an arm 460 carrying the brake 450.

The speeds of the motors 416 and 446 are chosen so that meter 438 will read zero when sun gear 422 revolves at the desired standard speed (i. e. 27.5 revolutions per second). In one arrangement, motor 416 runs at 30 revolutions per second, and the gearing driven by motor 446 is so designed that shaft 434 is running at 12.5 revolutions per second when the meter 438 reads zero. As the speed variation is ahead of the transmission 70, it affects the speed of all of the disks 74 by the same ratio, so that adjustments of all the speeds are the same proportion of the standard speeds, and can be read on a single scale 440 as hundredths of the various semitones ("cents") regardless of the fact that the succeeding semitones are also ratios and not fixed numbers of vibrations per second.

The arrangement of Figure 10 differs from that of Figure 8 in that turning the knob 458 shifts a movably mounted motor 546 to move a friction drive disk 550 radially of a driven friction disk 552 which drives the bevel pinions 442. In Figure 11 the shaft 434 is driven by a driven friction disk 554 drivably engaged by a friction driving disk 556 radially shifted by an arm 560 moved by turning the knob 458. Movement of the arm 560 is communicated by a link 562 to a lever 564 operating an indicator pointer 566 moving over the scale 440. The disk 556 is driven by gearing 570 from the armature shaft of the motor 416.

Figure 12:
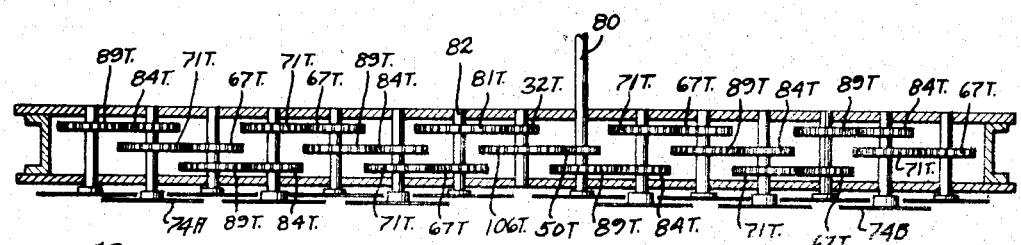
Figure 12 is a developed section of the gearing (corresponding to Figure 5)
Figure 13:
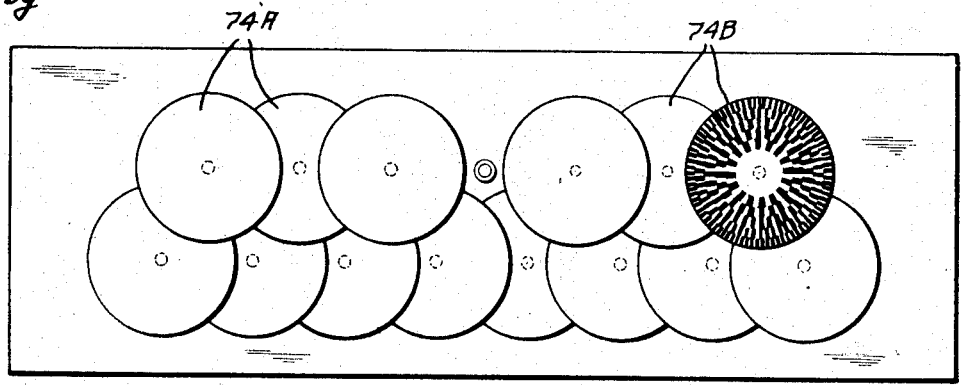
Figure 13 is an elevation of the stroboscopic disks (corresponding to Figure 3), of an apparatus which tunes by perfect fifths instead of by octaves.

Figures 12 and 13 show the arrangement of disks and gears for use in tuning perfect fifths instead of perfect octaves as the basic interval (i. e., corresponding to the derived interval $$\sqrt[7]{\frac{3}{2}}$$

for the semitone), and Figures 14 and 15 show the arrangement for tuning in perfect twelfths as the basic interval (corresponding to the derived interval $$\sqrt[19]{3}$$

for the semitone.

In the arrangement for perfect fifths there are, in effect, two sets of disks 74A and 74B, the two sets being alike but one driven at higher speed than the other. There are seven disks in each set, or 14 disks in all. On each disk there are five zones, having respectively 16, 24, 36, 54, and 81 dark sectors, alternating with white sectors. The shaft 80, driven at 27.5 revolutions per second as before, is connected to the shaft carrying the disk whose innermost (16-division) zone represents A—440 vibrations per second, and this disk is the first (i. e. nearest the center) of the disks 74B.

In this case the 89–84 ratio gears alternate with 71–67 ratio gears in driving the successive shafts, since these ratios closely approximate $$\sqrt[7]{\frac{3}{2}}$$

the first being slightly smaller and the second being slightly larger. The shaft directly connected to shaft 80, i. e. the A—440 shaft, carries a 50 tooth gear drivably meshing with a 106-tooth gear on an idler shaft 82 carrying a 32 tooth gear driving an 81-tooth gear on the last of the shafts carrying the disks 74A, to give the desired $(3/2)^5$ or 7.59375 ratio in the speeds of corresponding disks 74A and 74B.

In Figures 14 and 15 there are 19 disks 74C, each with four zones having respectively 2, 6, 18, and 54 dark sectors alternating with white sectors. The shaft carrying the A-440 disk is geared up from the shaft 80, driven at 27.5 R. P. S., by gears in the inverse ratio of the number of segments on the zone of the disk representing A=440 in the instant case 16/6. The gears used for this purpose may be an 80 tooth gear driving a 30 tooth gear. The gears on the successive shafts are in the ratio of 89 teeth to 84 teeth which closely approximates $$\sqrt[19]{3}$$

The following charts show the arrangement of the notes on the disks for tuning in perfect fifths and perfect twelfths. The subscripts and superscripts show the number of octaves the given note is below or above the middle C octave.

PERFECT FIFTHS

Disk and note chart

| Seg. | | | | | | | | | | | | | | | | |
|---|---|---|---|---|---|---|---|---|---|---|---|---|---|---|---|---|
| 81 | D | D# | E | F | F# | G | G# | C$^2$ | D$^2$ | D#$^2$ | E$^2$ | F$^2$ | F#$^2$ | G$^2$ | | |
| 54 | G$_1$ | G#$_1$ | A$_1$ | A#$_1$ | B$_1$ | C | C# | F#$^1$ | G$^2$ | G#$^2$ | A$^2$ | A#$^2$ | B$^2$ | C$^2$ | | |
| 36 | C$_1$ | C#$_1$ | D$_1$ | D#$_1$ | E$_1$ | F$_1$ | F#$_1$ | B$^1$ | C$^2$ | C#$^2$ | D$^2$ | D#$^2$ | E$^2$ | F$^2$ | | |
| 24 | F$_2$ | F#$_2$ | G$_2$ | G#$_2$ | A$_2$ | A#$_2$ | B$_2$ | E$^1$ | F$^1$ | F#$^1$ | G$^1$ | G#$^1$ | A$^1$ | A#$^1$ | | |
| 16 | A#$_3$ | B$_3$ | C$_2$ | C#$_2$ | D$_2$ | D#$_2$ | E$_2$ | A440 | A# | B | C$^1$ | C#$^1$ | D$^1$ | D#$^1$ | | |

PERFECT 12THS

Disk and note chart

| 54 | F#$^3$ | G$^2$ | G#$^2$ | A$^2$ | A#$^2$ | B$^2$ | C$^2$ | C#$^2$ | D$^3$ | D#$^3$ | E$^3$ | F$^3$ | F#$^3$ | G$^3$ | G#$^3$ | A$^3$ | A#$^3$ | B$^3$ | C$^4$ |
|---|---|---|---|---|---|---|---|---|---|---|---|---|---|---|---|---|---|---|---|
| 18 | B | C$^1$ | C#$^1$ | D$^1$ | D#$^1$ | E$^1$ | F$^1$ | F#$^1$ | G$^1$ | G#$^1$ | A$^1$ | A#$^1$ | B$^1$ | C$^2$ | C#$^2$ | D$^2$ | D#$^2$ | E$^2$ | F$^2$ |
| 6 | E$_1$ | F$_1$ | F#$_1$ | G$_1$ | G#$_1$ | A$_1$ | A#$_1$ | B$_1$ | C | C# | D | D# | E | F | F# | G | G# | A440 | A# |
| 2 | A$_3$ | A#$_3$ | B$_3$ | C$_3$ | C#$_2$ | D$_2$ | D#$_2$ | E$_2$ | F$_2$ | F#$_2$ | G$_2$ | G#$_2$ | A$_2$ | A#$_2$ | B$_2$ | C$_2$ | C#$_1$ | D$_1$ | D#$_1$ |

It is well understood that a tone sounded by a musical instrument generally includes harmonics or overtones. We have discovered that, although the flashing lamp 76 actually goes on and off in synchronism with the fundamental, the intensity of the light when on varies in accordance with the frequency of a superimposed harmonic wave if such a harmonic is present in the tone being measured. We have also discovered that this variation is sufficient to bring out or make visible a pattern on the stroboscopic disk having alternate black and white segments in an appropriate number.

Consequently, in Figure 16 we have shown a novel stroboscopic disk for use in our novel instrument for tuning to perfect octaves, which will also indicate the presence of a fifth harmonic. This disk may be indicated by the reference numeral 74D and comprises what might be considered to be a combination of two disks one of which has seven rows having 2, 4, 8, 16, 32, 64, and 128 alternate black and white segments and the other of which has seven rows having 10, 20, 40, 80, 160, 320, and 640 alternate black and white segments.

By this combination we have the black segments of the first disk sub-divided into three black and two white segments of size corresponding to the second described disk. The black segments of the second disk, which would appear in the white spaces of the first disk, are omitted. If no fifth harmonic is present these subdivisions become blurred and are not distinguishable, but if a fifth harmonic is present, they become quite distinct.

It will be observed that inasmuch as the octave, fifth, semitone, and cent all signify specific ratios this description discloses a general method for measuring with precision the ratios of any quantities. By a suitable choice of components these ratios may be read directly as logarithms of numbers proportional thereto taken to any base desired. (Reading a number of cents is tantamount to obtaining a logarithm on the base $$\sqrt[1200]{2})$$

There are essentially three parts to this ratio reading apparatus, the order of the first two being interchangeable:

(1) A system of interconnected standards related to each other successively by a common ratio (e. g. seven 2/1 ratios carried on a single disk);

(2) The subdivision of the basic ratio into a given number of equal ratios (e. g. twelve each equal $$\sqrt[12]{2})$$

(3) A calibrated adjustable portion so located as to affect the previously described interconnected standards and subdivisions by the same ratio, and capable of being adjusted and read over a range at least equal to the subdivision (e. g. over 100 cents equalling one $$\sqrt[12]{2}$$

ratio).

The scheme can be extended by the same principle if greater accuracy is required. For example, a change gear box having $$\sqrt[1200]{2}$$

steps could be interposed between the gear box described above and the adjustable drive so that an adjustment capable of being read over 100 scale marks would have to cover only a ratio of $$\sqrt[1200]{2}$$

thus making it possible to read to 0.00001 semitone.

While several embodiments of our invention have been described in detail, it is apparent that the principles disclosed may be applied to the measurement of ratios of any quantities, such as length, voltage, or frequency. Therefore, we do not intend that the scope of the invention be limited to the embodiments completely described or otherwise than by the terms of the claims which follow.

We claim:

1. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, and means for driving said members simultaneously at speeds differing successively substantially in the ratio of the numbers of vibrations in corresponding successive notes of a chromatic scale.

2. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, and means for driving said members simultaneously at speeds differing successively substantially in the ratio of the numbers of vibrations in corresponding successive notes of a chromatic scale, the patterns of said members being the same and each pattern including concentric zones with the pattern elements of each of the outer zones differing in number from those of the next inner zone in the ratio of rates of vibrations of two notes of the scale separated by a basic interval.

3. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, and means for driving said members simultaneously at speeds differing successively substantially in the ratio of the numbers of vibrations in corresponding successive notes of the chromatic scale, the patterns of said members being the same and each pattern including concentric zones representing octaves and with the pattern elements of each of the outer zones double the number of those of the next inner zone.

4. Apparatus of the class described comprising, in combination with means for flashing a light in synchronism with the vibration of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, and means for driving said members simultaneously at speeds differing successively substantially in the ratio of the numbers of vibrations in corresponding successive notes of a chromatic scale, the patterns of said members being the same and each pattern including concentric zones representing perfect fifths and with the pattern elements of each of the outer zones one and one-half times the number of those of the next inner zone.

5. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, and means for driving said members simultaneously at speeds differing successively substantially in the ratio of the numbers of vibrations in corresponding successive notes of a chromatic scale, the patterns of said members being the same and each pattern including concentric zones representing perfect twelfths and with the pattern elements of each of the outer zones three times the number of those of the next inner zone.

6. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, and means for driving said members simultaneously at speeds differing successively substantially in the ratio of the numbers of vibrations in corresponding successive notes of a chromatic scale, said stroboscopic members being arranged in the same order and relationship as the notes of the piano keyboard.

7. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, and means for driving said members simultaneously at speeds differing successively substantially in the ratio of the numbers of vibrations in corresponding successive notes of a chromatic scale, the patterns of said members being the same and each pattern including concentric zones representing octaves and with the pattern elements of each of the outer zones double the number of those of the next inner zone, said stroboscopic members being arranged in the same order and relationship as the notes of an octave of the piano keyboard.

8. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, and means for driving said members simultaneously at speeds differing successively substantially in the ratio of the numbers of vibrations in corresponding successive notes of a chromatic scale, said members being arranged to overlap each other, and the apparatus being provided with a cabinet in which it is housed and which cabinet has a plurality of openings for viewing parts of said members which are unobstructed by the overlapping arrangement.

9. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, and means for driving said members simultaneously at speeds differing successively substantially in the ratio of the numbers of vibrations in corresponding successive notes of a chromatic scale, the patterns of said members being the same and each pattern including concentric zones representing octaves and with the pattern elements of each of the outer zones double the number of those of the next inner zone, said stroboscopic members being arranged in the same order and relationship as the notes of an octave of the piano keyboard, said members being arranged to overlap each other, and the apparatus being provided with a cabinet in which it is housed and which cabinet has a plurality of openings for viewing parts of said members which are unobstructed by the overlapping arrangement.

10. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, and means for driving said members simultaneously at speeds differing successively substantially in the ratio of the numbers of vibrations in corresponding successive notes of a chromatic scale, the patterns of said members being the same and each pattern including concentric zones representing octaves and with the pattern elements of each of the outer zones double the number of those of the next inner zone, said stroboscopic members being arranged in the same order and relationship as the notes of an octave of the piano keyboard, said members being arranged to overlap each other, and the apparatus being provided with a cabinet in which it is housed and which cabinet has a plurality of openings for viewing parts of said members which are unobstructed by the overlapping arrangement, the openings for viewing the upper row of stroboscopic members being opposite the upper parts thereof and the openings for viewing the lower row being opposite the lower parts thereof, whereby if a note is flat (or sharp) its pattern will appear to shift slowly in the same direction whether the stroboscopic member carrying that pattern is in the upper or lower row.

11. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, and means driving successive members at rates of speed differing substantially in the ratio of the vibrations of successive notes of a chromatic scale.

12. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, and means driving successive members at rates of speed differing substantially in the ratio of $$\sqrt[12]{2}$$

13. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, and means driving successive members at rates of speed differing alternately in ratios slightly less than and slightly more than $$\sqrt[12]{2}$$

14. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, and means driving successive members at rates of speed differing alternately in the ratios 89/84 and 107/101.

15. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, means for driving said members simultaneously at speeds differing successively substantially in the ratio of the numbers of vibrations in corresponding successive notes of a chromatic scale, and means for changing the operation of the driving means to vary all of said speeds in the same ratio.

16. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, means for driving said members simultaneously at speeds differing successively substantially in the ratio of the numbers of vibrations in corresponding successive notes of a chromatic scale, means for changing the operation of the driving means to vary all of said speeds in the same ratio, and an indicating device operated by the last named means showing the variation of said speeds, whereby the amount a note is flat or sharp can be shown on the indicating device by operating the speed-varying means until one of the stroboscopic patterns appears stationary.

17. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, shafts carrying said members, gears connecting successive shafts and which are substantially in the ratio of the vibrations of successive notes of a chromatic scale, means for driving one of said shafts at such a speed that the speeds of the stroboscopic members are in synchronism with the flashing of said light when flashed in synchronism with the corresponding notes in true pitch, and means for varying the effective speed of the driving means to cause a corresponding ratio of variation in the speed of each of the stroboscopic members to bring the speed of one of said members into synchronism with the light when flashed by a note which is flat or sharp.

18. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, shafts carrying said members, gears connecting successive shafts and which are substantially in the ratio of the vibrations of successive notes of a chromatic scale, and means for driving one of said shafts at such a speed that the speeds of the stroboscopic members are in synchronism with the flashing of said light when flashed in synchronism with the corresponding notes.

19. Apparatus of the class described comprising, in combination with means for flashing a light in synchronism with the vibrations of a sound, a plurality of stroboscopic members having patterns thereon formed by substantially spaced pattern elements arranged to be illuminated by the flashing light so that the pattern on one of said members will appear substantially stationary when the speed of that member is in synchronism with the rate of flashing of the light, shafts carrying said members, gears connecting successive shafts and which are substantially in the ratio of the vibrations of successive notes of a chromatic scale, means for driving one of said shafts at such a speed that the speeds of the stroboscopic members are in synchronism with the flashing of said light when flashed in synchronism with the corresponding notes, means for varying the speed of said one shaft to bring the speed of one of said members into synchronism with the rate of flashing of the light as controlled by a musical note, and indicating means correlated with the speed-varying means and showing the amount said note is flat or sharp.

20. Apparatus as defined by claim 19, in which the indicating means has a scale calibrated to read in "cents."

21. Apparatus as defined by claim 16, in which the indicating device has a scale calibrated to read in "cents."

22. Apparatus of the class described comprising, in combination with means for flashing a light in synchronism with the vibrations of a sound, a plurality of stroboscopic means for presenting a plurality of moving patterns formed by spaced pattern elements to be illuminated by the light and including gearing providing different speeds for the stroboscopic means, a motor arranged to drive the gearing to operate the stroboscopic means at predetermined standard speeds, and adjusting means for varying the speed at which the gearing is driven by the motor.

23. Apparatus of the class described comprising, in combination with means for flashing a light in synchronism with the vibrations of a sound, a plurality of stroboscopic means for presenting a plurality of moving patterns formed by spaced pattern elements to be illuminated by the light and including gearing providing different speeds for the stroboscopic means, a motor arranged to drive the gearing at a standard speed to operate the stroboscopic means, adjusting means for varying the speed at which the gearing is driven by the motor, and indicating means operated by manipulation of the adjusting means and showing the variation from said standard speed.

24. Apparatus as defined by claim 22, in which the gearing comprises intermeshing sets of gears each providing a different speed with all the speeds at fixed ratios, whereby manipulation of the adjusting means varies all of the different speeds in the same ratio without changing the ratios between the different speeds.

25. Apparatus of the class described comprising a plurality of stroboscopic means provided with patterns formed by spaced pattern elements, gearing for driving said means including intermeshing sets of gears each providing a different speed so that said stroboscopic means are driven at different speeds, a motor connected to drive said gears, and means for varying the effective speed with which the motor drives the gears whereby all of the different speeds are simultaneously varied in the same ratio.

26. Apparatus of the class described comprising a plurality of stroboscopic means provided with patterns formed by spaced pattern elements, gearing for driving said means including intermeshing sets of gears each providing a different speed so that said stroboscopic means are driven at different speeds, a motor connected to drive said gears, means for varying the effective speed with which the motor drives the gears whereby all of the different speeds are simultaneously varied in the same ratio, and indicating means correlated with the speed-varying means and showing the ratio of the variation.

27. Apparatus of the class described comprising a plurality of parts, operating means for driving said parts at speeds related successively by a chromatic interval of a musical scale, means for creating a vibration of unknown frequency, means for indicating when said unknown frequency has a definite relationship to the speed of one of said parts, and means for adjusting the operation of the first means within said chromatic interval to bring the speed of one of said parts into said relationship to the unkown frequency and means to indicate the speed of the operating means when it is so adjusted.

28. Stroboscopic apparatus comprising, in combination with a light having means for causing flashing in synchronism with an unknown complex wave form, a disk illuminated by the flashing light and provided with a composite pattern comprising concentric rings, each ring consisting of pattern elements spaced corresponding to a fundamental frequency having superposed thereon pattern elements spaced corresponding to a harmonic thereof, and with the fundamental frequencies of successive rings forming a series and related according to a basic musical interval.

29. Apparatus of the class described comprising, in combination with means for flashing a light in synchronism with the vibrations of a sound, a plurality of stroboscopic means for presenting a plurality of moving patterns formed by spaced pattern elements to be illuminated by the light and including gearing providing different speeds for the stroboscopic means, a motor arranged to drive the gearing to operate the stroboscopic means at predetermined standard speeds, and adjusting means for varying the speed at which the gearing is driven by the motor, said gearing including a plurality of shafts each driven at one of said speeds and each of which shafts is constructed and arranged to drive one of said stroboscopic means.

30. A device of the class described comprising stroboscopic indicating members arranged in the order and relationship of the black and white keys of a piano keyboard, and means for driving said members at speeds differing in proportion to the vibration frequencies of the respective notes corresponding to similarly-positioned keys and means for flashing a light on said members at the frequency of a note to be determined.

31. In a stroboscopic tuning apparatus for tuning a vibrator for sounding a note, the combination of a frame, a plurality of rotary members mounted for rotation on the said frame, each of said rotary members having a plurality of circumferentially spaced divisions, means for rotating said rotary members at distinctive speeds so that the said divisions on each rotary member will pass an observation point at a predetermined frequency corresponding to a certain note of a musical scale, an electric circuit including a lamp of neon type for casting rays onto the said rotary members at the observation point, and sound-sensitive means controlled by the frequency of the vibrator for flashing the lamp at the same frequency as the vibrator that is to be tuned.

32. Stroboscopic apparatus comprising, in combination with a light having means for causing flashing in synchronism with a complex wave form of unknown frequencies, a rotatable disk illuminated by the flashing light and provided with a composite pattern consisting of pattern elements periodically spaced to form a pattern corresponding to a harmonic frequency of a wave similar to said wave form and which will appear to be stationary if said complex wave form has a frequency corresponding to said harmonic frequency, said elements being arranged in groups periodically spaced to form a pattern corresponding to the fundamental frequency of a wave similar to said wave form and which will appear to be stationary if said complex wave form has a frequency corresponding to said fundamental frequency.

33. Stroboscopic apparatus comprising, in combination with a light having means for causing flashing in synchronism with a complex wave form of unknown frequencies, a rotatable disk illuminated by the flashing light and provided with a composite pattern consisting of pattern elements spaced corresponding to the frequency of a wave similar to the fundamental wave of said wave form, and which will appear to be stationary if said complex wave form has a frequency corresponding to the spacing of the pattern elements, and having superposed thereon pattern elements spaced corresponding to a harmonic of said frequency and which will appear to be stationary if said complex wave form has a frequency corresponding to said harmonic.

34. Apparatus for determining ratios comprising the combination of a plurality of movable parts, operating means for driving said parts at speeds differing in a ratio approximating a given root of a common ratio by which the successive units of a mathematical series are related, calibrating means for adjusting said operating means to drive said parts at any arbitrary speed within a range corresponding to the smallest subdivision of said series, each of said parts being formed with a pattern consisting of uniformly spaced pattern elements, a light for illuminating said parts, and means to cause the light to flash in synchronism with an unknown frequency.

35. Apparatus for determining ratios comprising the combination of a plurality of movable parts, operating means for driving said parts at speeds differing in a ratio approximating a given root of a common ratio by which the successive units of a mathematical series are related, calibrating means for adjusting said operating means to drive said parts at any arbitrary speed within a range corresponding to the smallest subdivision of said series, indicating means connected to be operated by said calibrating means and calibrated to be read according to parts of said smallest subdivision, each of said parts being formed with a pattern consisting of uniformly spaced pattern elements, a light for illuminating said parts, and means to cause the light to flash in synchronism with an unknown frequency.

ROBERT W. YOUNG.
ALLEN LOOMIS.

Certificate of Correction

Patent No. 2,286,030.      June 9, 1942.

ROBERT W. YOUNG ET AL.

It is hereby certified that errors appear in the printed specification of the above numbered patent requiring correction as follows: Page 6, second column, line 45, for "$^{1200}\sqrt{2}$" read $100\ ^{1200}\sqrt{2}$; page 9, second column, line 69, claim 27, for "unkown" read *unknown*; and that the said Letters Patent should be read with these corrections therein that the same may conform to the record of the case in the Patent Office.

Signed and sealed this 11th day of August, A. D. 1942.

[SEAL]

HENRY VAN ARSDALE,
*Acting Commissioner of Patents.*